J. GAGE.
Making Boxes.
No. 94,591.  Patented Sept. 7, 1869.
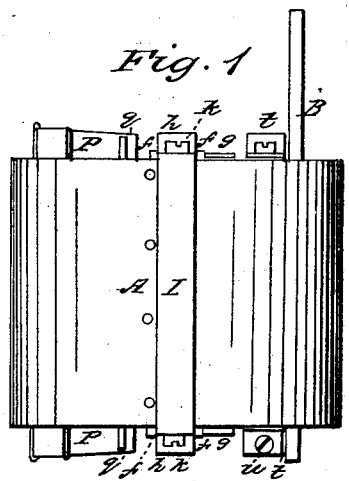
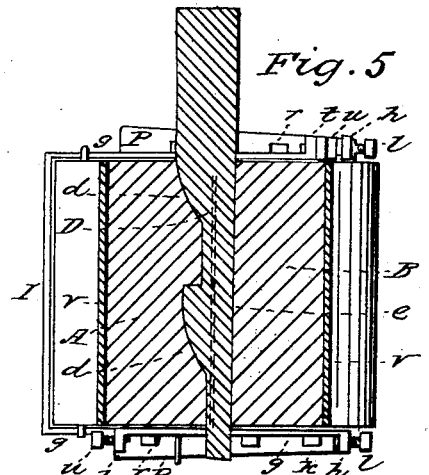
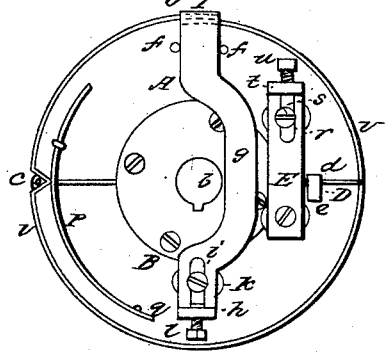
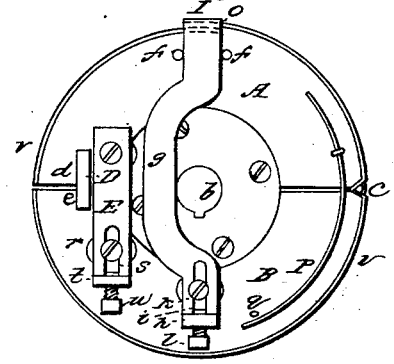
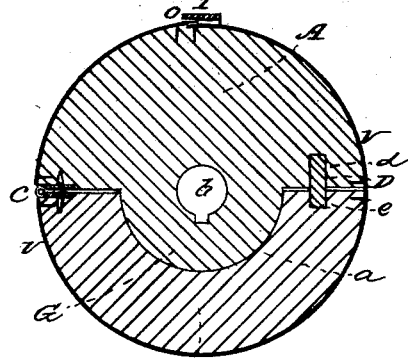
Witnesses:
Inventor:
John Gage.
by his attorney

United States Patent Office.

JOHN GAGE, OF HENNIKER, NEW HAMPSHIRE.

Letters Patent No. 94,591, dated September 7, 1869.

IMPROVEMENT IN MACHINE FOR FORMING SHELLS FOR DRY MEASURES.

The Schedule referred to in these Letters Patent and making part of the same.

*To all persons to whom these presents may come:*

Be it known that I, JOHN GAGE, of Henniker, of the county of Merrimack, and State of New Hampshire, have invented a new and useful Machine to be Used in the Formation of the Shells of Dry Measures, or other articles of like nature; and I do hereby declare the same to be fully described in the following specification, and represented in the accompanying drawings, of which—

Figure 1 is a side view.
Figures 2 and 3, opposite end elevations, and
Figure 4, a transverse section of it.
Figure 5 is a horizontal section, taken through the wedge, to be hereinafter described.

The body of the machine is composed of two parts, A B, each being semi-cylindrical on its outer surface.

One of them has a semi-cylindrical projection, C, arranged concentrically with it, and the other has a semi-cylindrical recess, $a$, in it to receive the projection C, there being a hole, $b$, made axially through the projection C to receive a shaft, on which the machine is to be mounted when in use.

This shaft is to be duly supported in and by a frame, so as to enable the machine to be revolved, as occasion may require.

The two body-parts A B, at their lower edges, are united together by a hinge, $c$, and they are provided with a wedge, D, arranged between them, for the purpose of forcing them asunder, such wedge being placed in recesses, $d\ e$, (made in the parts A B,) which, with the wedge, are formed in manner as represented.

A bow-clamp, I, arranged on the periphery of the part A, embraces the ends of the body, and slides between guide-pins, $f$, projected therefrom.

Each leg, $g$, of the clamp is provided at its end with a lip, $h$, which is extended from the leg at a right angle.

Near to the said lip the leg has a slot, $i$, made through it to receive a screw, $k$, which goes through the slot and screws into the part B.

Another screw, $l$, is screwed through the lip $h$, which, when the parts A B are expanded, brings up against the head of the screw $k$.

While screws $k$ and the slots $i$ of both ends of the body serve to hold the clamp in connection with the part B, so as to admit of the latter being moved, either toward or away from the part A, the screws $l$ are for the purpose of adjusting the clamp relatively to the periphery of the part A, and in accordance with the thickness of the strip of wood or other material to be bent in the machine, the clamp being to hold the strip, at or near one end of it, to the said periphery, in order that the strip may be bent around such.

Close to one edge of the clamp the part A has a shoulder, $o$, for the end of the strip of material to abut against.

There is a curved spring, $p$, fixed to each end of the part A, and made to bear against a stud, $q$, projected from the part B, such being so as to cause the spring, by its elastic force, to move the part B up to or toward the part A while the wedge is being retracted.

Furthermore, in order to prevent the clamp from being broken or overstrained by the wedge, there is applied to each end of the machine a guard, E, which is a slotted plate, pivoted at one end to the part B, and connected with the part A by a screw, $r$, which goes through a slot, $s$, in the guard, and is screwed into the part A.

The said guard has a lip, $t$, projecting from it, through which another screw, $w$, is screwed, and when the smaller end of the screw $w$ brings up against the head of the screw $r$, the guard will arrest the further movement of the parts A B asunder, and thus prevent overstraining of the clamp, and indentation and crushing of the strip of material by it.

The adjustments of the guards are also to enable a person to regulate the distance to which the parts A B may be moved asunder, in order to attain the proper size of the measure-shell, so as to have the measure of the correct diameter when made.

In using the machine, the strip of wood, metal, or other material which is to compose what is termed the "shell" or rim of the measure, or that of a drum, for instance, is to have one end passed between the clamp and the periphery of the part A, and against the shoulder of such periphery.

Next, the strip is to be bent around the periphery of the machine, and over and beyond the clamp the necessary distance for the overlap, after which the wedge should be set up so as to expand the parts A B to the proper extent.

Nails should next be driven through the lapped parts of the strip, and clinched against the periphery of the machine, such periphery being composed of metal, or of sheet-metal, $v$, when the parts A and B, in other respects, are made of wood.

I claim—

1. The combination and arrangement of the clamp I and the wedge D with the body-parts A B, constructed, arranged, and hinged together, substantially as described.

2. Also, the combination of the guard E and its screws $r\ u$, arranged at each end of the machine, with the body-parts A B, the clamp I, and wedge D, applied and arranged together, substantially in the manner and so as to operate as and for the purpose explained.

3. Also, the combination of the clamp-adjusting screws $k\ l$ with such clamp, the body-parts A B, and the wedge D, arranged together, as set forth.

4. Also, the combination and arrangement of the springs $p$ with the wedge, the clamp, and the body-parts A B, arranged and applied together, substantially in manner and so as to operate as set forth.

5. Also, the arrangement of the shoulder $o$ with the clamp I and the periphery of the machine or parts A thereof.

JOHN GAGE.

Witnesses:
R. H. EDDY,
SAMUEL N. PIPER.